US012584557B2

(12) United States Patent
Kim et al.

(10) Patent No.: US 12,584,557 B2
(45) Date of Patent: Mar. 24, 2026

(54) SEALING MEMBER AND METHOD FOR MANUFACTURING SAME

(71) Applicant: FLOWSERVE KSM CO., LTD., Gimpo-si (KR)

(72) Inventors: Yun Ho Kim, Seoul (KR); Joo Hwan Kim, Incheon (KR)

(73) Assignee: FLOWSERVE KSM CO., LTD., Gimpo-si (KR)

( * ) Notice: Subject to any disclaimer, the term of this patent is extended or adjusted under 35 U.S.C. 154(b) by 726 days.

(21) Appl. No.: 17/922,117

(22) PCT Filed: Jun. 30, 2021

(86) PCT No.: PCT/KR2021/008256
§ 371 (c)(1),
(2) Date: Oct. 28, 2022

(87) PCT Pub. No.: WO2022/005198
PCT Pub. Date: Jan. 6, 2022

(65) Prior Publication Data
US 2023/0175591 A1 Jun. 8, 2023

(30) Foreign Application Priority Data

Jul. 1, 2020 (KR) ........................ 10-2020-0081160

(51) Int. Cl.
*F16J 15/34* (2006.01)
*C04B 35/52* (2006.01)
*C04B 35/565* (2006.01)

(52) U.S. Cl.
CPC ......... *F16J 15/3496* (2013.01); *C04B 35/522* (2013.01); *C04B 35/565* (2013.01)

(58) Field of Classification Search
None
See application file for complete search history.

(56) References Cited

U.S. PATENT DOCUMENTS

| | | | |
|---|---|---|---|
| 5,364,248 A | 11/1994 | Nakashima et al. | |
| 5,422,322 A | 6/1995 | Chen et al. | |
| 5,998,318 A | 12/1999 | Takanami et al. | |
| 6,926,127 B2 * | 8/2005 | Bauer | C04B 35/63496 188/218 XL |
| 8,647,546 B2 * | 2/2014 | Abe | F16D 69/00 264/108 |
| 9,383,017 B2 * | 7/2016 | Young | F16J 15/3408 |
| 2006/0038353 A1 * | 2/2006 | Murakami | F16J 15/348 277/399 |

(Continued)

FOREIGN PATENT DOCUMENTS

| | | |
|---|---|---|
| EP | 2 375 111 A1 | 10/2011 |
| JP | 61-124727 A | 6/1986 |

(Continued)

OTHER PUBLICATIONS

International Search Report for PCT/KR2021/008256 dated, Sep. 24, 2021 (PCT/ISA/210).

*Primary Examiner* — Seth Dumbris
(74) *Attorney, Agent, or Firm* — Sughrue Mion, PLLC

(57) ABSTRACT

The present invention provides a sealing member which includes a substrate including silicon carbide; and a plurality of cylindrical or polygonal columnar graphites dispersed in the substrate, and a method for manufacturing the same.

11 Claims, 6 Drawing Sheets

(56)                References Cited

U.S. PATENT DOCUMENTS

| | | | |
|---|---|---|---|
| 2010/0212148 | A1 | 8/2010 | Kawahara |
| 2011/0253924 | A1 | 10/2011 | Yashima et al. |
| 2015/0040697 | A1 | 2/2015 | Yamane et al. |
| 2018/0258992 | A1 | 9/2018 | Yamauchi |

FOREIGN PATENT DOCUMENTS

| | | | | |
|---|---|---|---|---|
| JP | S61124727 | A | * | 6/1986 |
| JP | 63-53316 | A | | 3/1988 |
| JP | 10-251063 | A | | 9/1998 |
| JP | 2001-26792 | A | | 1/2001 |
| JP | 2009-040637 | A | | 2/2009 |
| JP | 2013-148187 | A | | 8/2013 |
| JP | 5271928 | A | | 8/2013 |
| JP | 5289464 | B2 | | 9/2013 |
| JP | 2018-146059 | A | | 9/2018 |
| KR | 10-0286532 | B1 | | 3/2001 |
| KR | 10-2006-0053093 | A | | 5/2006 |
| KR | 10-1119797 | B1 | | 3/2012 |
| KR | 10-1893490 | B1 | | 8/2018 |
| KR | 10-2162480 | B1 | | 10/2020 |
| WO | 2010/146646 | A1 | | 12/2010 |

* cited by examiner

【Figure 1】
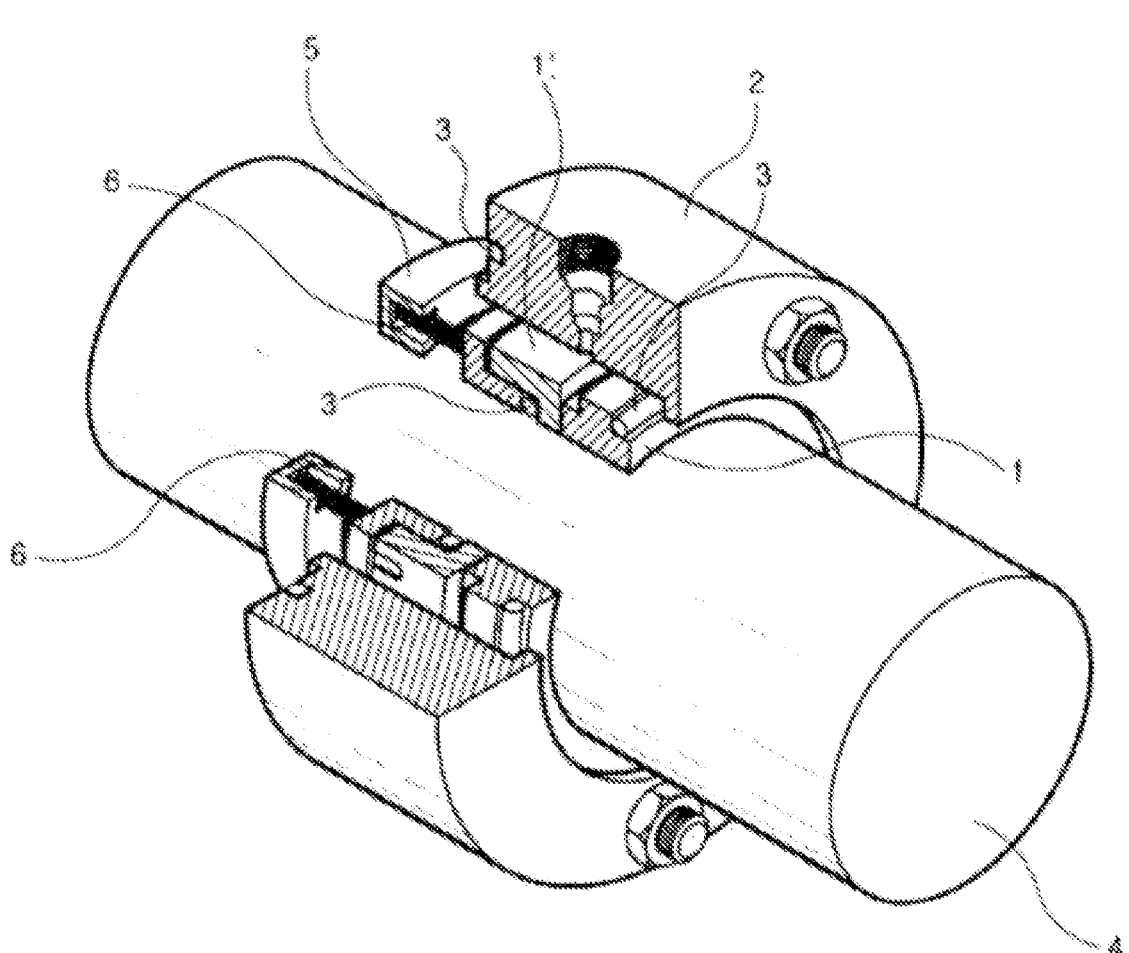

【Figure 2】
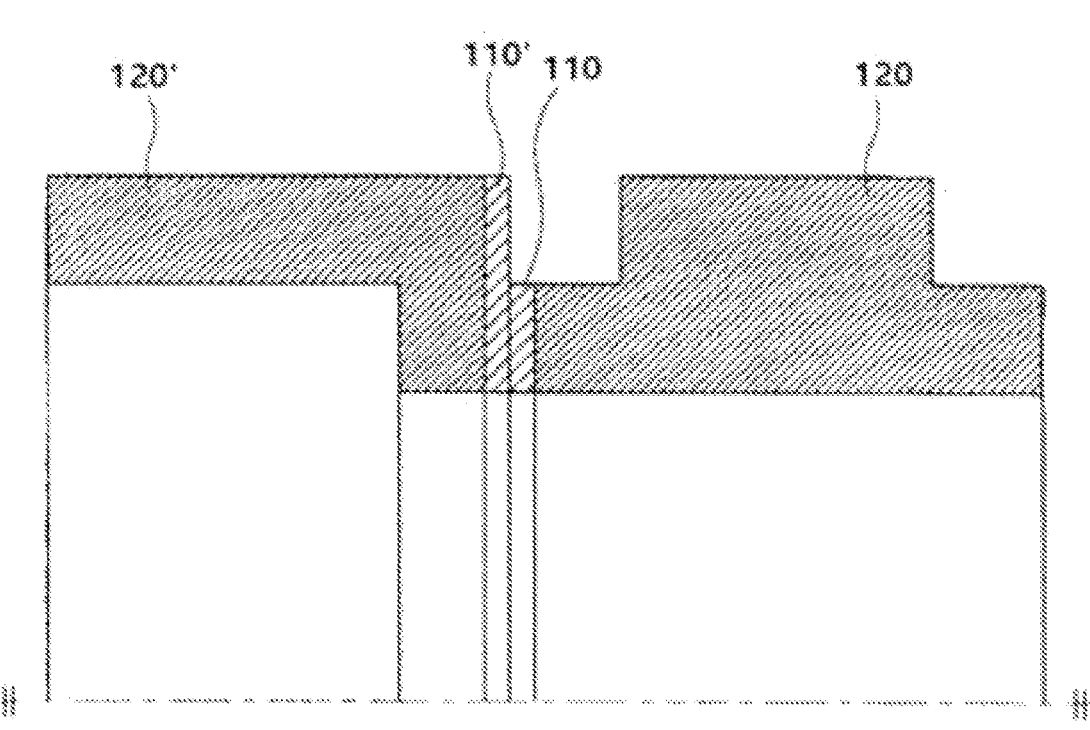

【Figure 3】
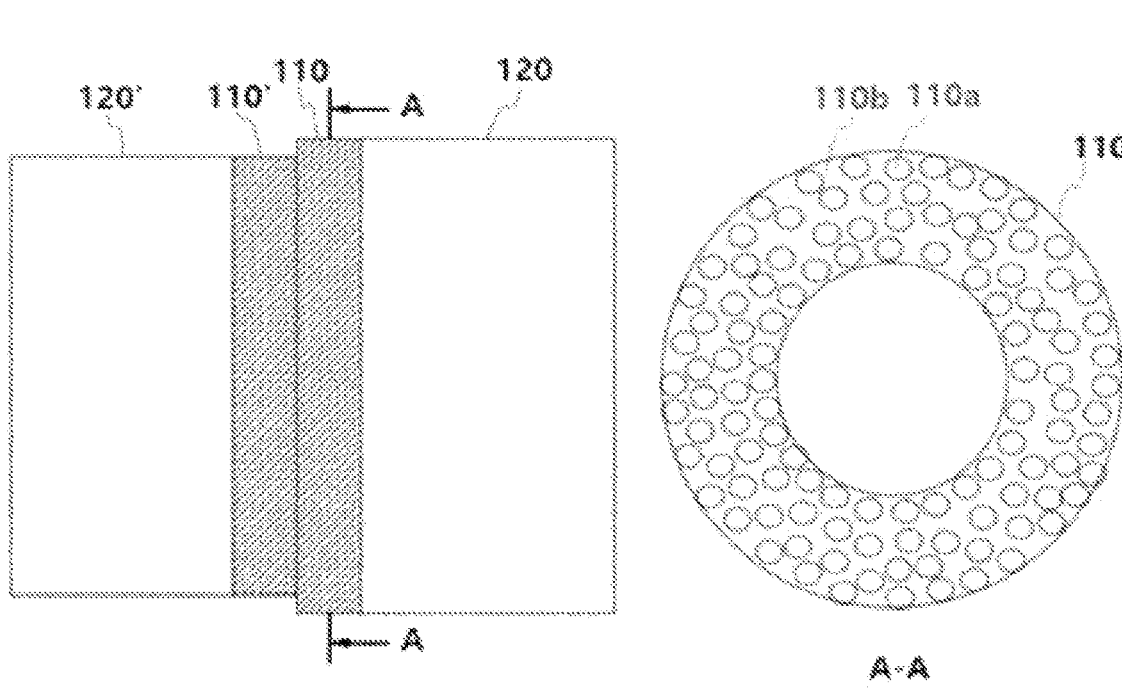
A-A

【Figure 4】
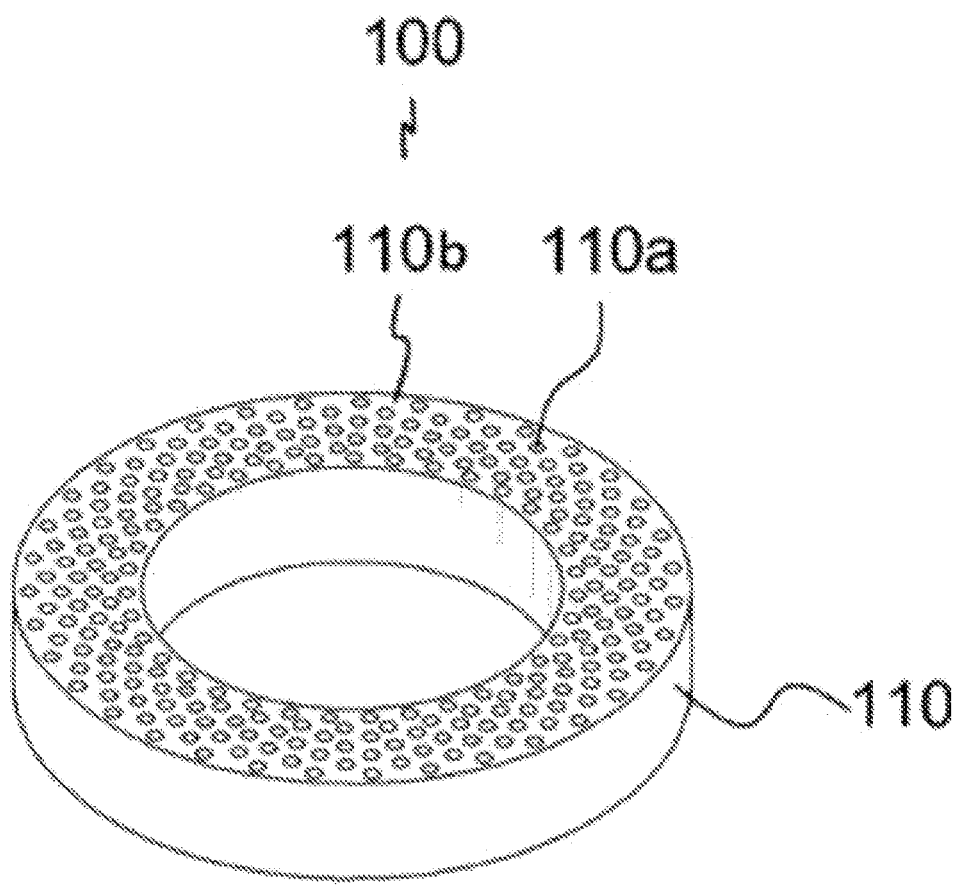

[Figure 5]
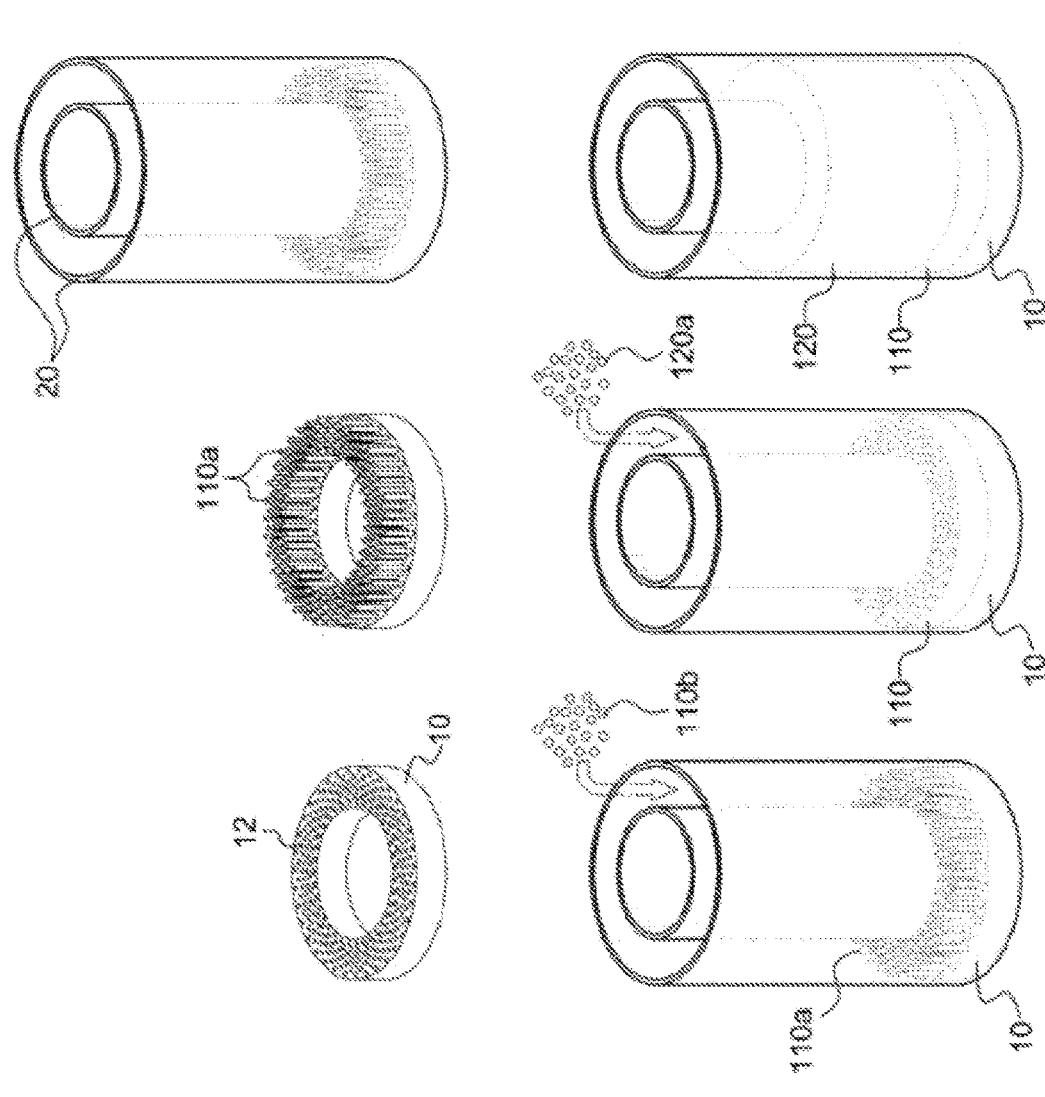

【Figure 6】
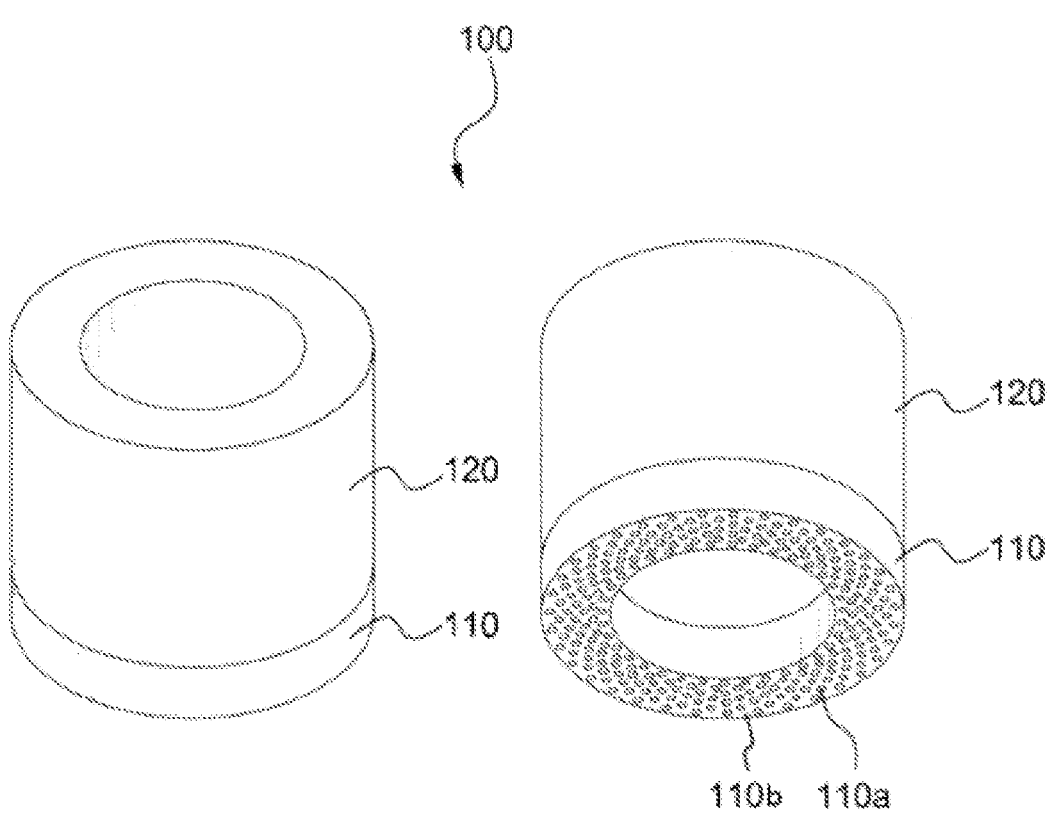

SEALING MEMBER AND METHOD FOR MANUFACTURING SAME

CROSS REFERENCE TO RELATED APPLICATIONS

The present application is a National Stage of International Application No. Entry of PCT/KR2021/008256 filed Jun. 30, 2021 claiming priority based on Korean Patent Application No. 10-2020-0081160 filed on Jul. 1, 2020, the entire contents of which are incorporated herein by reference.

TECHNICAL FIELD

The present invention relates to a sealing member in which a friction surface thereof is made of a composite material of graphite and silicon carbide to have lubricity and wear resistance at the same time, and a method for manufacturing the same.

BACKGROUND ART

An apparatus in which a shaft as a rotating element and a shaft coupling as a fixed element are used in combination, especially in a rotating machine apparatus such as a pump and a ship shaft that need to prevent leakage of fluid, a device that seals a gap between the rotating element and the fixed element is essential.

Since lubricity and wear resistance are required for the sealing device as described above at the same time, and a sealing member capable of satisfying lubricity and wear resistance at the same time is used accordingly. As such a sealing member, there is a mechanical sealing member, which is a shaft sealing device of a rotary machine shown in FIG. 1. The mechanical sealing member is used in the shaft sealing device of the rotary machine, and has a function of sealing and shutting off a fluid, while giving little resistance to high-speed rotation of the shaft sealing device.

Specifically, as shown in FIG. 1, the shaft sealing device brings a ring-shaped housing-side sealing member 1 together with a packing 3 closer to a gland ring 2 coupled to the housing, brings a shaft-side sealing member 1' elastically provided by a spring 6 to a fixed collar 5 closer to a shaft 4, and rotates the sealing members 1 and 1' of the housing and the shaft in a state of being brought close to each other to enable rotation in a state of preventing leakage of fluid between inner and outer spaces. In such a device, the sealing members 1 and 1' generate a high mutual frictional force. Therefore, high hardness, wear resistance and chemical stability are essential, and excellent lubricity for smooth mechanical operation is also required at the same time. It is also required to have excellent thermal conductivity to prevent thermal deformation.

As related arts for satisfying such physical properties, a method for dispersing graphite particles in silicon carbide to improve the self-lubricating effect and manufacture a silicon carbide member for sealing with high thermal conductivity and low coefficient of friction; a method for infiltrating molten silicon into a porous graphite substrate and then forming silicon carbide through a chemical reaction between silicon and carbon to form a composite of silicon carbide and graphite and improve lubricity; and a method for improving mechanical strength and lubricity by dispersing graphite particles of 10 to 75 μm or less by 2 to 30% by weight in a magnetic sintered silicon carbide substrate.

However, in such methods, because a significant amount of graphite particles are dispersed in the silicon carbide substrate, although the lubricity increases, there was a drawback that the hardness and wear resistance of the silicon carbide-graphite composite decrease, and the specific gravity and mechanical strength of the product are degraded.

In addition, because it is difficult to uniformly control the graphite particles and disperse the fine graphite particles uniformly in the silicon carbide substrate, there was a problem that the locally non-uniformly dispersed graphite particles cause an adverse effect which degrades uniformity of the mechanical properties and lubricity of the silicon carbide substrate.

In addition, there was a drawback that since deterioration of the state of the worn surface due to an increase in the amount of wear and non-uniform wear when long-term use is unavoidable, the life of the sealing member is shortened.

PRIOR ART DOCUMENT

Patent Document

U.S. Pat. No. 5,422,322

DISCLOSURE

Technical Problem

The present inventors have worked diligently to solve the above-described problems of the related art, and have found a method for uniformly dispersing graphite particles in a silicon carbide substrate, thereby completing the present invention.

An object to the present invention is to provide a sealing member which is excellent in hardness, wear resistance and chemical stability, and at the same time excellent in lubricity for smooth mechanical operation and excellent in thermal conductivity for preventing thermal deformation.

Another object of the present invention is to provide an efficient method for manufacturing the sealing member.

Technical Solution

In order to achieve the above object, the present invention provides a sealing member which includes:

a substrate including silicon carbide; and a plurality of cylindrical or polygonal columnar graphites dispersed in the substrate.

Furthermore, the present invention provides a method for manufacturing a sealing member comprising the steps of:

(a) placing a plurality of cylindrical or polygonal columnar graphites in a mold to be spaced apart from each other;

(b) filling a space between the graphite particles with a composition including silicon carbide and a binder;

(c) pressing the inside of the mold to manufacture a molded element;

(d) machining the molded element into a desired shape; and (e) sintering the machined molded element.

Advantageous Effects

The sealing member of the present invention provides excellent hardness, wear resistance and chemical stability, and provides excellent lubricity for smooth machine operation. The sealing member also provides excellent thermal conductivity to prevent thermal deformation. Therefore, it can be effectively used for sealing a gap between a rotating element and a fixed element in a rotary machine device.

Further, the method for manufacturing the sealing member of the present invention enables manufacturing of the sealing member having the above properties in an extremely efficient manner.

DESCRIPTION OF DRAWINGS

FIG. 1 is a perspective view showing a usage pattern of a mechanical sealing member, which is a shaft sealing device of a rotary machine.

FIGS. 2 and 3 are cross-sectional views showing an embodiment of the sealing member of the present invention.

FIG. 3 is a diagram which shows an embodiment of the sealing member of this invention, and a cross section of a contact material.

FIG. 4 is a perspective view showing an embodiment of the sealing member of the present invention.

FIG. 5 is a perspective view showing an embodiment of a method for manufacturing the sealing member of the present invention.

FIG. 6 is a perspective view showing an embodiment of the sealing member of the present invention.

BEST MODE

Hereinafter, embodiments of the present invention will be described in detail with reference to the accompanying drawings so that those skilled in the art can easily implement the present invention. This invention may, however, be embodied in many different forms and is not limited to the embodiments set forth herein. Similar parts are denoted the same reference numerals throughout the specification.

FIGS. 2, 3, 4 and 6 are diagrams showing an embodiment of the sealing member of the present invention. The sealing member of the present invention includes a substrate 110*b* including silicon carbide, and a plurality of cylindrical or polygonal columnar graphites 110*a* dispersed on the substrate.

In an embodiment of the present invention, the plurality of cylindrical or polygonal columnar graphites can be disposed in a state of being oriented in one direction as shown in FIG. 5. Here, one direction means front, rear, side, and the like.

In an embodiment of the present invention, the plurality of cylindrical or polygonal columnar graphites can be disposed in parallel.

In an embodiment of the present invention, the plurality of cylindrical or polygonal columnar graphites can be disposed such that a minimum gap among the gaps between them is 60% or more of a maximum gap, preferably such that the minimum gap is 80% or more of the maximum gap, more preferably such that the minimum gap is 90% or more.

A conventional sealing member is manufactured in a form in which a contact material in which a considerable amount of graphite particles are dispersed in a silicon carbide substrate is bonded to a substrate mainly composed of silicon carbide.

However, since the contact material as described above is used by manufacturing a slurry containing silicon carbide particles, graphite particles and a binder, it was very difficult to uniformly disperse the graphite particles in the silicon carbide substrate. Therefore, there was a problem that graphite particles that are locally non-uniformly dispersed cause an adverse effect of deteriorating the uniformity of mechanical properties and lubricity of the silicon carbide substrate.

In addition, due to the above problems, the hardness and wear resistance of the silicon carbide-graphite composite are reduced, and there was a drawback of the wear surface deterioration due to increased wear amount during long-term use and uneven wear.

The present inventors have solved the above-described drawbacks of the related art by machining graphite into cylindrical or polygonal columnar shapes and dispersing them in a silicon carbide substrate, and have completed a sealing member capable of improving the hardness and wear resistance of the contact material and improve the lubricity.

In the present invention, since the sealing member has not only hardness, wear resistance and chemical stability, but also lubricity for smooth mechanical operation, it can be used for sealing that requires such physical properties without limitation. Also, the form of the sealing member is not particularly limited, because it can be manufactured in various ways depending on the required usage pattern.

In an embodiment of the present invention, the area occupied by the plurality of cylindrical or polygonal columnar graphites in any cross section of the sealing member may be 5 to 50%, more preferably 20 to 40%, of the total cross-sectional area.

In an embodiment of the present invention, a plurality of cylindrical or polygonal columnar graphites having a maximum cross-sectional width of 10 μm to 2000 μm (corresponding to the diameter in the case of a columnar shape) can be used. At this time, the maximum length can be adjusted in consideration of the size and shape of the sealing member.

The polygonal column means a triangular column, a polygonal column, a 5 to 10-sided column, and the like. The cylindrical or polygonal columnar shapes can include similar configurations.

In an embodiment of the present invention, the form of the sealing member is not particularly limited as long as it is a form used for sealing. In an example, the sealing member can have a cylindrical tubular shape, as shown in FIGS. 3, 4 and 6.

In an embodiment of the present invention, the sealing member includes a substrate 120 and a contact material 110, and the contact material 110 may have the form that includes a substrate 110*b* including silicon carbide, and a plurality of cylindrical or polygonal columnar graphites 110*a* dispersed in the substrate.

The substrate 120 can be formed from a substrate that includes, but is not limited to, silicon carbide. The substrate 120 and the silicon carbide substrate of the contact material may be configured with the same composition, or may be configured with different compositions.

In an embodiment of the invention, the substrate and contact material can have a configuration that extends outward at the interface.

The length of the contact material may be 50% or less, 40% or less, 30% or less, or 20% or less on the basis of the length of the entire sealing member.

The form of the sealing member is not particularly limited as long as it is a form used for sealing. In an example, the sealing member may have a cylindrical tubular shape, as shown in FIG. 6.

In an embodiment of the present invention, the sealing member can be used in a sealing part in which friction occurs, as shown in FIGS. 1 to 3. It can also be used to seal between a rotating element and a fixed element. Specifically, the sealing member can be used for a shaft sealing device of a rotary machine.

For example, a method for manufacturing the sealing member of the present invention will be described below. However, the method for manufacturing the sealing member is not limited to the methods exemplified below, and can be manufactured by well-known and commonly used techniques in this field.

The method for manufacturing the sealing member of the present invention includes the steps of:

(a) placing a plurality of cylindrical or polygonal columnar graphites in a mold to be spaced apart from each other;

(b) filling a space between the graphite particles with a composition including silicon carbide and a binder;

(c) pressing the inside of the mold to manufacture a molded element;

(d) machining the molded element into a desired shape; and (e) sintering the machined molded element.

Since the sealing member described above in the present invention and the method for manufacturing the sealing member described therein have the same technical characteristics, the relevant content can be applied to both inventions in common. Therefore, repeated content will be omitted below.

In step (a), the plurality of cylindrical or polygonal columnar graphites may be disposed at regular intervals, but is not limited thereto. Specific portions can be disposed with a higher density according to the needs of the actual use, and can be disposed in various forms in addition to this form.

Also, the plurality of cylindrical or polygonal columnar graphites can be disposed parallel to each other, but are not limited thereto, and can be disposed in various non-parallel configurations. Parallel does not only mean perfect parallel, but should be understood as a concept that includes a case of being disposed similar to the parallel state. Furthermore, since it is difficult to dispose them completely parallel due to manufacturing limitations, it should be understood as the concept that includes substantially parallel arrangement.

The cylindrical or polygonal columnar graphites in step (a) should not move when the composition containing silicon carbide is filled in step (b). Therefore, as shown in FIG. 5, a graphite fixing member 10 having fixing grooves 12 capable of fixing a plurality of cylindrical or polygonal columnar graphites in the state of being spaced apart can be used. Moreover, a plate in which a plurality of cylindrical or polygonal columnar graphites are fixed while being separated from each other can be used. Alternatively, a graphite plate may be engraved from above, the lower portion fixed to the graphite plate, and a plurality of mutually spaced cylindrical or polygonal columnar graphites may be formed. However, the method is not limited thereto, and any known method can be applied without limitation as long as it can fix graphite at regular intervals.

When the above method is used, it is possible to disposed the cylindrical or polygonal columnar graphites at uniform intervals, and if necessary, since it is possible to arrange a specific portion with a higher density, this method is preferable.

In the above step (a), the mold means a mold having the shape of the sealing member to be manufactured in the present invention, and for example, a mold 20 shown in FIG. 5 can be used, but is not limited thereto.

As the composition containing silicon carbide and a binder in step (b), a granule composition in the form manufactured in the form of slurry or manufactured by mixing silicon carbide and a binder into granules above may be used. The granular composition can be manufactured by a known production method such as spray drying.

Compositions in the form of slurry may contain conventional solvents. The binder may be one or more selected from the group consisting of polyvinyl alcohol (PVA), polyethylene glycol (PEG), methylcellulose (MC), polyvinyl acetate (PVAc), polyacrylamide (PAA) and the like. but not limited thereto, and any component may be used without limitation, as long as it is possible to bond silicon carbide particles. In the present invention, polyvinyl alcohol (PVA) is particularly preferably used.

The compositions containing silicon carbide and a binder may further contain additional ingredients such as dispersant, plasticizer, lubricant and defoamer commonly used in the field.

As the silicon carbide, those known in the art can be used. For example, one or more selected from the group consisting of reaction sintered silicon carbide, solid phase sintered silicon carbide, liquid phase sintered silicon carbide, and the like can be used.

The step (b) of filling the space between graphite with a composition containing silicon carbide and a binder can be performed by any known technique used in this field, known methods such as applying ultrasonic waves to fill the filler with high density can be used without limitation.

In the step (c), the pressing may be applied at a pressure of 200 to 1200 kg/cm$^2$, preferably 300 to 1000 kg/cm$^2$.

The step (d) of machining the molded element into a desired shape can be performed in various forms known in the art, typically by green machining.

In the step (e), the sintering can be performed at a temperature of 1200° C. to 2200° C. Specifically, the reaction sintering can be performed at a temperature of 1500° C. to 1600° C. for, the normal pressure sintering can be performed at a temperature of 2000° C. to 2200° C., and the liquid phase sintering can be performed at a temperature of 1700° C. to 1900° C. Moreover, the sintering can be performed by a vacuum sintering furnace. At this time, a sintering time may be 5 minutes to 3 hours, preferably 10 minutes to 1 hour. The sintering causes a permeation reaction of the molten silicon.

In an embodiment of the present invention, the step (b) may include a step of filling the space between the graphite particles with a composition including silicon carbide and a binder to form a contact material, and additionally filling a top thereof with a composition including silicon carbide and the binder to form a base material.

The sealing member manufactured in this manner has the form shown in FIG. 6. At this time, the composition containing silicon carbide and a binder used when forming the contact material and the composition containing silicon carbide and the binder used when forming the substrate may have the same different compositions.

Hereinafter, although preferred examples will be presented to aid understanding of the present invention, it is clear to those skilled in the art that the following examples merely describe the present invention as an example, and various changes and modifications can be made within the scope and technical spirit of the present invention. It is understood that such changes and modifications fall within the scope of the appended claims.

Example 1: Manufacturing of Sealing Member

After mixing 95% by weight of silicon carbide powder having an average particle size of 10 μm and 5% by weight of polyvinyl alcohol (PVA) as a binder using a ball mill to prepare a silicon carbide slurry, the slurry was spray-dried to prepare silicon carbide granules.

As shown in FIG. 5, after the columnar graphite having a diameter of 1 mm and a length of 10 mm was inserted and fixed into the fixing groove 12 of a graphite fixing member 10 having a fixing groove 12 capable of fixing a plurality of graphite pieces in a spaced apart state, the mold was joined.

Next, the granules prepared above were filled in the space between the cylindrical graphite pieces to form a contact material, and the space above the contact material was further filled with the granules to a height of 50 mm to form a substrate.

A molded element was manufactured by applying a pressure of 500 kg/cm$^2$ to the contact material and the substrate filling, and subjected to green machining.

The green-machined molded element was heated in a vacuum sintering furnace at 1600° C. for 30 minutes, and reaction sintering was performed by an infiltration reaction of molten silicon. The sealing member that had undergone the reaction sintering was subjected to finish polishing and filament-like machining of the sealing member to complete a final sealing member.

On the friction surface of the contact material of the completed sealing member, a graphite area to the total area was found to be 10%.

Examples 2 to 4: Manufacturing of Sealing Member

As shown in Table 1 below, a sealing member was manufactured in the same manner as in Example 1, except that the diameter of the cylindrical graphite and the graphite area compared to the total area ratio friction surface were adjusted differently.

TABLE 1

| Test number | Graphite area/total area of friction surface | Diameter of graphite cylinder (μm) | Sintering temperature [° C.] |
|---|---|---|---|
| Example 1 | 10 | 1000 | 1600 |
| Example 2 | 20 | 500 | 1600 |
| Example 3 | 30 | 500 | 1600 |
| Example 4 | 40 | 500 | 1600 |

Comparative Example 1: Manufacturing of Sealing Member

27% by weight of graphite particles with an average particle size of 5 μm, 63% by weight of silicon carbide powder with an average particle size of 10 μm, and 10% by weight of polyvinyl alcohol (PVA) as a binder were mixed to manufacture a slurry, and was spray-dried to manufacture graphite-silicon carbide granules.

The mixture was filled into a molding die capable of forming the shape of a sealing member to a height of 20 mm, and the composition including silicon carbide powder with an average particle size of 10 μm and polyvinyl alcohol as a binder at a weight ratio of 9:1 was filled on the filling material to a height of 50 mm, a pressure of 500 kg/cm$^2$ was applied with a press to manufacture a molded element, and the molded element was subjected to green machining.

The green-machined molded element was heated in a vacuum sintering furnace at 1600° C. for 30 minutes, and reaction sintering was performed by an infiltration reaction of molten silicon. The sealing member that had undergone the above reaction sintering was subjected to finish polishing and filament-like machining to complete the final sealing member.

It was confirmed that the graphite area to the total area on the friction surface of the contact material of the completed sealing member was 30%.

TABLE 2

| Test number | Graphite area/total area of friction surface | Graphite average grain size (μm) | Sintering temperature [° C.] |
|---|---|---|---|
| Comparative Example 1 | 30 | 5 μm | 1600 |

Experimental Example: Evaluation of Physical Properties of Sealing Member

The physical properties of the sealing members manufactured in Examples 1 to 4 and Comparative Example 1 were evaluated by the following methods.

<Density>

The density of the sealing member was evaluated by the Archimedes method using GF-6100 scale manufactured by AND company.

<Amount of Wear>

The amount of contact material wear was measured by the pressure-velocity limit (P-V Limit) test method according to the sealing member evaluation procedure.

TABLE 3

| Test number | Graphite area/total area of friction surface | Diameter of graphite cylinder (um) | Density (g/cc) | Amount of wear (μm) | Form of wear |
|---|---|---|---|---|---|
| Example 1 | 10 | 1000 | 3.06 | 0.5 | Even wear |
| Example 2 | 20 | 500 | 3.05 | 0.5 | Even wear |
| Example 3 | 30 | 500 | 3.05 | 0.6 | Even wear |
| Example 4 | 40 | 500 | 3.03 | 0.8 | Even wear |
| Comparative example 1 | 30 | Graphite average particle size (μm) 5 | 2.65 | 8.2 | Wear surface non-uniformity |

As set forth in Table 3 above, the sealing members of Examples 1 to 4 of the present invention were confirmed to have significantly superior improved density, wear resistance, and wear form compared to the sealing member of Comparative Example 1, which was manufactured by another method.

In particular, Example 4 was confirmed to have better density and wear resistance, even though the graphite area of the friction surface compared to the total area was much higher than the Comparative Example.

The invention claimed is:

1. A method for manufacturing a sealing member used in a sealing part in which friction occurs, the method comprising the steps of:

(a) placing a plurality of cylindrical or polygonal columnar graphites in a mold to be spaced apart from each other and in parallel;

(b) filling a space between the plurality of cylindrical or polygonal columnar graphites with a composition including silicon carbide and a binder;

(c) pressing the mold to manufacture a molded element;

(d) separating the molded element shaped with the plurality of cylindrical or polygonal columnar graphites and the composition including silicon carbide and a binder from the mold;

(e) machining the molded element into a desired shape; and (f) sintering the machined molded element, wherein the plurality of cylindrical or polygonal columnar graphites are disposed in a direction perpendicular to a wear surface, and a substrate surface including silicon carbide exposed on the wear surface and cross-sections of the plurality of cylindrical or polygonal columnar graphites are machined to form a plane, and wherein in step (c), the pressing is applied at a pressure of 200 to 1200 kg/cm², and in step (f), the sintering is performed at a temperature of 1200° C. to 2200° C.

2. The method for manufacturing a sealing member according to claim 1, wherein the step (b) includes a step of filling the space between the plurality of cylindrical or polygonal columnar graphites with the composition including silicon carbide and a binder to form a contact material, and additionally filling a top of the contact material with the composition including silicon carbide and a binder to form a base material.

3. The method for manufacturing a sealing member according to claim 2, wherein a length of the contact material is 50% or less based on a total length of the sealing member in its entirety.

4. The method for manufacturing a sealing member according to claim 1, wherein a minimum gap among gaps of the plurality of cylindrical or polygonal columnar graphites are disposed to be 60% or more of a maximum gap.

5. The method for manufacturing a sealing member according to claim 4, wherein the minimum gap among gaps of the plurality of cylindrical or polygonal columnar graphites are disposed to be 80% or more of the maximum gap.

6. The method for manufacturing a sealing member according to claim 1, wherein an area occupied by the plurality of cylindrical or polygonal columnar graphites are 5 to 50% of a total cross-sectional area in any cross section of the sealing member.

7. The method for manufacturing a sealing member according to claim 1, wherein the plurality of cylindrical or polygonal columnar graphites have a maximum cross-sectional width of 10 μm to 2000 μm.

8. The method for manufacturing a sealing member according to claim 1, wherein the sealing member has a cylindrical tubular shape.

9. The method for manufacturing a sealing member according to claim 1, wherein the silicon carbide is at least one or more selected from a group consisting of reaction-sintered silicon carbide, solid-phase sintered silicon carbide, and liquid-phase sintered silicon carbide.

10. The method for manufacturing a sealing member according to claim 1, wherein the sealing member seals between a rotating element and a fixed element.

11. The method for manufacturing a sealing member according to claim 10, wherein the sealing member is used in a shaft sealing device of a rotary machine.

* * * * *